(12) United States Patent
Nelson et al.

(10) Patent No.: US 7,885,548 B1
(45) Date of Patent: Feb. 8, 2011

(54) FREE SPACE OPTICAL COMMUNICATION (75) Inventors: Ryan L. Nelson, Farmington, MN (US); Brian L. Uhlhorn, St. Paul, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 908 days.

(21) Appl. No.: 11/657,240

(22) Filed: Jan. 24, 2007

(51) Int. Cl.
H04B 10/00 (2006.01)

(52) U.S. Cl. ............... 398/131; 398/123; 398/129

(58) Field of Classification Search ........... 398/129, 398/130, 131, 123, 18; 359/334; 375/356
See application file for complete search history.

(56) References Cited

U.S. PATENT DOCUMENTS

| | | | |
|---|---|---|---|
| 4,775,971 A | 10/1988 | Bergmann | |
| 4,966,447 A | 10/1990 | Huang Alan et al. | |
| 5,062,150 A | 10/1991 | Swanson et al. | |
| 6,335,811 B1 | 1/2002 | Sakanaka | |
| 6,347,001 B1 * | 2/2002 | Arnold et al. | 398/122 |
| 6,834,164 B1 | 12/2004 | Chan | |
| 6,856,741 B2 | 2/2005 | Britz | |
| 6,960,750 B2 | 11/2005 | Doane | |
| 7,058,307 B2 | 6/2006 | Sakanaka | |
| RE39,397 E | 11/2006 | Wilde et al. | |
| 7,136,585 B2 * | 11/2006 | Bloom | 398/37 |
| 7,292,789 B1 * | 11/2007 | Capots et al. | 398/125 |
| 7,379,117 B2 * | 5/2008 | Hwang | 348/371 |
| 2002/0071160 A1 * | 6/2002 | Pavelchek | 359/152 |
| 2004/0012770 A1 * | 1/2004 | Stierle et al. | 356/4.01 |
| 2004/0208272 A1 * | 10/2004 | Moursund et al. | 375/356 |
| 2006/0140644 A1 | 6/2006 | Paolella | |
| 2006/0209766 A1 | 9/2006 | Britz et al. | |
| 2008/0047939 A1 * | 2/2008 | Hummelt | 219/121.64 |

OTHER PUBLICATIONS

Free-space optics: telecom without the fiber, OpticsReport, Jun. 15, 2002 http://www.opticsreport.com/content/printable.php?id=1012 &command=article.

* cited by examiner

*Primary Examiner*—Dzung D Tran
(74) *Attorney, Agent, or Firm*—Brooks, Cameron & Huebsch, PLLC (57) ABSTRACT

Free space optical communication systems, methods, and apparatuses are provided. A free space optical communication system embodiment includes a light source for emitting a light beam toward a receiver, where the light beam includes a signal to be transmitted, an output lens through which the light beam is directed toward the receiver, and an actuator coupled to the light source for moving the light source to adjust the diameter of the light beam.

25 Claims, 4 Drawing Sheets

FREE SPACE OPTICAL COMMUNICATION

FIELD OF THE DISCLOSURE

The present disclosure generally relates to free space optics. And, in particular, the present disclosure relates to free space optics such as free space optical communication systems, and other such fields.

BACKGROUND

Free space optics (FSO) is a telecommunication technology that uses light propagating in free space to transmit data between two points. The technology can be useful where the physical connection of the transmit and receive locations is difficult. For example, in cities, the laying of fiber optic cables can be expensive and, in some instances, impractical based upon the infrastructure already built.

Free space optics can also be used to communicate between spacecraft, since outside of the atmosphere there is little to distort the signal. Such systems can also be used in aircraft if the system is designed to track the position of the first location (e.g., the vehicle) with respect to the position of the second location (e.g., a ground station receiver or transceiver).

In some instances, the optical links use infrared laser light. Communication is also possible using light emitting diodes (LEDs) or other light sources, in some systems.

The beams of light in FSO systems are transmitted by light focused on receivers. These receivers can, for example, be telescopic lenses able to collect the photon stream and transmit digital data.

The data can be any item of information that can be transmitted on a communication system. For example, types of data can include one or more application programs (i.e., sets of executable instructions), files to be executed by such programs, or data, among other types. Files to be executed can, for example, take the form of Internet messages, video images, radio signals, or computer files, among other items.

SUMMARY

Embodiments of the present disclosure provide various methods, apparatuses, and systems for free space optical communication. In various embodiments, a free space optical communication system can include a light source for emitting a light beam toward a receiver, where the light beam includes a signal to be transmitted.

As stated above, light source can be of any suitable type including laser sources, LED sources, or other light emitting source types. In some embodiments, the light from one or more light sources can be provided via an optical fiber or a number of optical fibers. In such embodiments, the intensity of light can be changed by increasing or decreasing the intensity of the light source, increasing or decreasing the number of light sources producing light, and/or increasing or decreasing the number of optical fibers utilized to provide more light to form the light beam.

Additionally, the system can include any type of encoder for encoding the signal into the beam. Examples of encoders include electro-absorption and electro-optical modulators among others.

Embodiments can also include one or more output lenses through which the light beam can be directed toward the receiver. The lenses can be of any suitable variety and can be used, for example, to reduce the diameter of a light beam, increase the diameter of a light beam, or collimate a light beam.

Various embodiments can include a number of actuators for moving the light source and/or one or more of the lenses to adjust the diameter of the light beam. The actuator can be any suitable type of mechanism capable of moving the one or more components to be actuated (e.g., one or more lenses and/or light sources). For example, suitable types of actuators include gearing mechanisms such as worm gears and/or electrical actuators, such as a piezo-electric actuator, among others.

In such embodiments, the optical fibers can have the same or different optical properties. For example, the optical fiber can produce different intensity light beams.

In some embodiments, the optical fibers can be connected to different light sources, for example, having different intensities and/or different wavelengths. In such embodiments, the combination or use of different light sources and/or optical fibers can be used to broaden or narrow the light beam and/or improve the ability of a light beam to communicate having a larger diameter.

In some embodiments, the optical properties of the lens material of one or more lenses can be used instead of, or in addition to, the movement of the light source and/or the one or more lenses. For example, in various embodiments, the lens material can be modified to change one or more of a number of optical characteristics of the lens material. The modifiable lens can be made from any suitable material.

For example, if it is desirable to change the focal length of the modifiable lens, materials such as water, liquid crystal, or suitable polymers may be utilized. Such materials may be used in combination with other non-modifiable lens materials in some embodiments. These materials can be modified, for example, utilizing changes in pressure, temperature, stress, shape change, and/or chemical change, among other mechanisms for modification.

In such actuated and non-actuated embodiments, some benefits of the embodiments include the ability to change the data rate of the signal, to change the amount of power consumed by the apparatus and/or system in generating the signal, to change the range of the transmitted beam, to allow for easier tracking of a moving receiver and/or maintain connectivity between a moving transmitter and/or receiver, and/or can aid in identifying the position of one or more receivers. Accordingly, in some embodiments, control circuitry can be used to control the movement of the components of the apparatus and/or system based upon information about the apparatus and/or system or the one or more receivers.

For example, in some embodiments, an embodiment can include controller for controlling the movement of the one or more components, a data rate adjustor for adjusting the data rate based upon the position of the light source, and/or in intensity adjustor for adjusting the intensity of the light source. In some embodiments, the apparatus can include a control apparatus for driving one or more actuators based on information about a position of one or more receivers to adjust the diameter of the light beam.

These features can be provided by executable instructions, circuitry, or a combination of the two. For instance, in some embodiments, the data rate adjustor can be a logic circuitry, such as a processor or application specific integrated circuit (ASIC).

In various embodiments, the system can include one or more additional types of communication links. Such additional communication links can be used to provide redundancy of can be used to provide different types of information, or information at different data rates between the locations that are communicating with each other.

As stated above, the present disclosure also includes a number of apparatus embodiments. For example, in some free space optical communication apparatus embodiments, the apparatus can include a light source for emitting a light beam toward a receiver, where the light beam includes a signal to be transmitted.

Apparatus embodiments can also include an output lens through which the light beam is directed toward the receiver. An actuator coupled to the output lens for moving the lens to adjust the diameter of the light beam can be provided in various apparatus embodiments.

Such apparatus and system embodiments can be utilized in a number of different fields such as those described above, among others. For example, in some embodiments, a free space optical communication apparatus is mounted to or provided within an unmanned aerial vehicle (UAV).

In some embodiments, the free space optical communication apparatus can include a gimbal tracking actuator for movement of the apparatus based upon information about a position of one or more receivers. In such embodiments, the apparatus can include instructions executable on a processor and stored in memory to track the position of multiple receivers.

The tracking functionality can be accomplished in any suitable manner. For example, tracking can be accomplished through use of information provided by a beacon signal, a Global Positioning System (GPS) component or device, and/or an Inertial Navigation System (INS) component or device.

GPS and INS information can be useful, for example, where a receiver is in a fixed position or where the receiver is moving, but is aware of its GPS location and can communicate that information to the vehicle. In such a manner, the tracking system can direct the light beam based upon the information received and can adjust the beam for longer or shorter range, or wider diameter to enhance its ability to locate the receiver, among other functions available to the communication apparatus or system. For instance, this information can also be used to calculate the adjustment of the output lens and/or the gimbal tracking actuator to direct the light beam from a first receiver to a second receiver of the multiple receivers.

The present disclosure also includes a number of method embodiments. For example, in some method embodiments, a method for providing free space optical communication can include receiving an incoming beacon signal from a communication apparatus.

Method embodiments can also include moving a light source in an unmanned aerial vehicle based on a position of the incoming beacon signal received to alter a light beam diameter. In some embodiments, a method can include transmitting the light beam through a lens to direct the beam toward a source of the incoming beacon signal, where the light beam includes a signal to be transmitted.

In various embodiments, a method can include adjusting the intensity of the light beam based upon the position of the light source. As discussed above, this adjustment can be accomplished in a variety of manners.

Additionally, the basis upon which the light beam is adjusted can be provided by various types of information. For example, in some embodiments, adjusting the intensity of the light beam can be based upon position information provided by the beacon signal.

In some embodiments, moving the light beam can include moving the beam in six degrees of freedom to adjust the diameter of the beam and the direction of the beam. In this manner, the light beam can be directed toward the receiver and the diameter can be changed.

Moving the light source can include moving the light source to a first position that provides a first beam diameter and moving the light source to a second position that provides a second beam diameter. In some embodiments, the first diameter can be larger than the second diameter. This can be beneficial, for example, where the first diameter is sized to provide a broad diameter, low rate signal transmission beam for aiding in locating the unmanned aerial vehicle with the communication apparatus. The broad diameter, low data rate signal can be used to aid in locating the receiver, in sending smaller pieces of information, and/or in saving power.

In some embodiments, the method can include evaluating a number of environmental conditions and positioning the light source based upon at least one of the number of environmental conditions. For example, environmental conditions such as precipitation, vibration, distance, and other conditions can affect the ability of the apparatus and/or system to function.

In some situations, information about such conditions can be used in determining the position of the light source. For instance, a broader diameter beam may be used when precipitation is falling, thereby increasing the likelihood that a signal will be received.

Additionally, in aerial vehicle applications, turbulence may move the vehicle around and if the beam is too small, communication may be interrupted due to the movement. In such instances, a system can be designed to provide a broader diameter beam and, thereby, the movements may not be substantial enough to interrupt the communication because the receiver is still within the diameter of the beam at the receiving end.

Environmental information can be obtained in any suitable manner. For example, environmental information can be received from a control station or from one or more sensors, devices, or apparatuses located in the area. Such information can also be provided by sensors on or associated (e.g., connected to) with the apparatus.

In some embodiments, environmental information can be obtained based upon the condition of a received signal. For example, the signal strength of a received signal may indicate that one or more environmental elements may be affecting the signal (e.g., a weak signal may indicate that rain is present along the signal path and it is degrading the signal). In some embodiments, executable instructions can be used to increase or decrease the signal strength and/or widen or narrow the beam diameter based upon the condition of a received signal.

In some embodiments, the method can include receiving a beacon signal from a beacon source proximate to the light beam receiver. The beacon signal can provide information regarding the location of the receiver and, thereby, the apparatus and/or system can make appropriate adjustments to establish or maintain the communication link. In other words, the light source can be moved based upon positioning information received in the beacon signal.

The functions discussed above can be accomplished, for example, by logic circuitry and/or by having a processor and memory within, attached to, or in communication with the free space optical apparatus or system. For instance, computer executable instructions can be provided in memory and executable by the processor to communicate with the actuators and/or optical telescope to obtain information about the emission and/or receipt of a light wave.

Electronic circuits can be utilized to accomplish such functions instead of or in addition to computer executable instructions. These and other advantages of the various embodiments of the present disclosure will become evident upon reading the disclosure.

DETAILED DESCRIPTION

As discussed herein, free space optical communication can been used in applications where the size, weight, power conservation, and/or adjustability of the light beam used to transmit a signal may be of relatively low concern. For example, such characteristics can be of low concern in some communication applications, for example, between buildings.

However, in some applications, the size, weight, power conservation, and/or adjustability of the light beam used to transmit a signal can be more important. For example, the use of a free space optical (FSO) communication system between an aircraft, for example, an unmanned aerial vehicle (UAV) and one or more ground communication apparatuses can be beneficial for the high-speed transmission of data.

Some UAVs can have a relatively small size as compared to other aircraft, and in some instances, size, weight, power conservation, and/or adjustability of the light beam used to transmit a signal may be considerations when determining if a FSO communication system is usable, or in selecting a type of FSO communication system or apparatus. Embodiments of the present disclosure can be utilized in various environments, such as the use with aerial, land, water, space vehicles and/or between buildings or other structures.

In addition, in some such environments, such as the environments experienced by some UAV systems, considerably more movement can be experienced as compared to many environments where a FSO communication system is used between buildings. Further, the movement can be quicker, it can be in more directions, and/or it can be more unpredictable, among other qualities. Embodiments of the present disclosure include free space optics communication systems, apparatuses, and methods that can provide high-speed transmission of data given the aforementioned considerations, among others. Additionally, these environments can expose an apparatus or system to environmental conditions that may affect the ability to maintain a communication link.

A free space optical communication system that can be used between two buildings, among other locations, can include two FSO apparatuses that can receive and transmit high speed data signals as well as track the apparatus from which the data is being sent, for example, through the use of a beacon signal.

Such systems can include a first FSO apparatus in a first position and a second FSO apparatus in a second position, such that the apparatuses can send and receive information between them. Such FSO apparatuses can include a light transmission/reception lens component and a movable mirror.

In such apparatuses, a data signal can be sent from the first FSO apparatus to the second FSO apparatus in the form of a light beam from a light emitting element. For example, the light beam can be sent from the light source toward a movable mirror, where the movable mirror can direct the signal through free space (e.g., the atmosphere) to the second FSO apparatus.

In some instances, a main signal and a pilot signal can be sent from the first FSO apparatus and received by the second FSO apparatus together. The main signal can contain the data to be transmitted using the free space optical link, while the pilot signal from a pilot signal generator can be used by the second FSO apparatus to track the position of the incoming main signal. These signals can travel on the same communication link or on parallel or serial links (e.g., two sets of transmitters and receivers or transceivers).

The main signal to be transmitted can be amplified by an amplifier, and can be multiplexed with the pilot signal from the pilot signal generator by a multiplexer. The main signal can be converted into an optical signal by the light source. The output light coming from the light source can be transmitted through a transmission optical component such as a transmission/reception lens toward the second FSO apparatus in the form of a light beam.

In addition, the first FSO apparatus can receive a data signal and track the position of the received data signal from the second FSO apparatus so as to provide the optical link when small changes in position occur due to, for example, building sway, vehicle movement, wind, temperature changes, and/or precipitation. A received light beam coming from the second FSO apparatus can enter the transmission/reception lens and be received by a receiver component.

In some embodiments, a light beam can be focused on a photodetector that can detect the position at which the light is detected by the photodetector. For example, the photodetector can, in some embodiments, be a 4-split photodetector, where the photodetector surface is split into four (4) quadrants to measure the light output in each quadrant to determine the position of the focused light beam, among other types of photodetectors that can detect position.

The main signal received can be converted into an electrical signal by the main signal photodetector, and the electrical signal can be amplified by a second amplifier. The amplified signal can be output as a reception signal from an output terminal. In some instances, the second amplifier can receive a signal fed back from a detecting circuit to attain automatic gain control.

Embodiments of the present disclosure can adjust one or more light source components and/or one or more lens components to change the diameter of the light beam being transmitted from one location to another. This can be useful in a number of circumstances. For example, if the environmental conditions are stable, it may be possible to utilize a narrow diameter beam for providing the communication link.

However, if one or more environmental conditions are potentially hindering the communication, embodiments of the present disclosure provide a number of solutions. For example, the beam diameter can be increased to allow for more movement of one location with respect to another, the intensity of the beam can be increased, and/or the data rate can be decreased.

Additionally, in some instances it may be beneficial to be able to conserve power by reducing the intensity of the beam. This can be accomplished in the distance between the two locations communicating with each other is suitable for maintaining communication with a lower intensity beam and/or if the environmental conditions are suitable.

In some embodiments, the apparatus or system can be adjustable based upon such changes in these various conditions and relative positions. Such embodiments may enable these apparatuses and systems to be applied more broadly in more applications and fields of technology.

Embodiments of the present disclosure will now be described in relation to the accompanying drawings, which will at least assist in illustrating the various features of the various embodiments. In the Figures, the first digit of a reference number refers to the Figure in which it is used, while the remaining two digits of the reference number refer to the same or equivalent parts of embodiment(s) of the present disclosure used throughout the several figures of the drawing. The scaling of the figures does not represent precise dimensions and/or dimensional ratios of the various elements illustrated herein.

Figure 1:
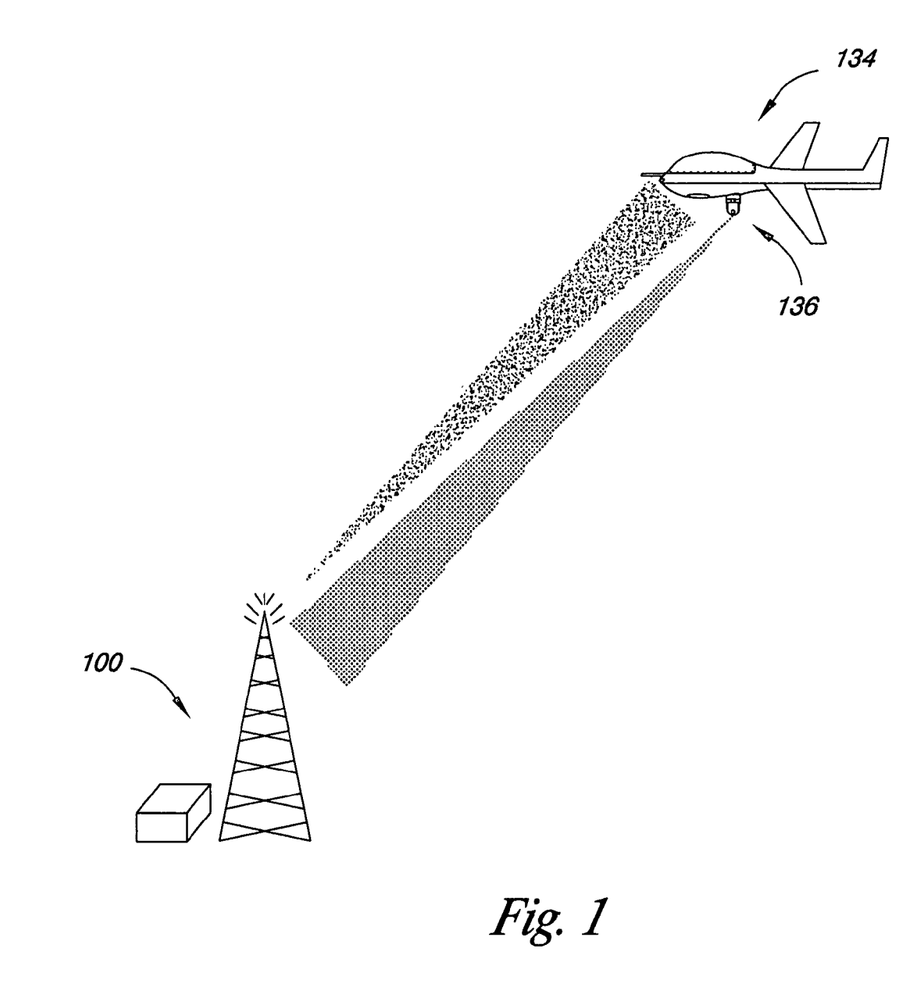
FIG. 1 is an illustration of an embodiment of a free space optical communication system according to the present disclosure.

FIG. 1 is an illustration of an embodiment of a free space optical communication system according to the present disclosure. FIG. 1 illustrates a ground communication apparatus 100 and a free space optical communication apparatus 136 mounted on an unmanned aerial vehicle (UAV) 134.

In some embodiments, the ground communication apparatus 100 can be a stationary free space optical communication apparatus that can receive high speed data transmissions and also transmit a beacon signal. In addition, the ground communication apparatus 100 can, in some instances, be mounted to an air field tower, where the tower and the ground communication apparatus are relatively permanent.

In some embodiments, the ground communication apparatus 100 can be portable, so that the ground communication apparatus 100 can be transported to a location and can receive data transmissions from a free space optical communication apparatus 136 in and/or around the location. For example, the ground communication apparatus 100 can be mounted to an automobile vehicle, and a UAV 134 can be sent to collect video images of the area around the vehicle. In such embodiments, the communication can then be carried on between the aerial vehicle, the automobile, and/or one or more other (e.g., remote) ground or aerial communications apparatuses.

In some embodiments, a beacon signal can be received by the free space optical communication apparatus 136 mounted on the UAV 134. The beacon signal can be received by the free space optical communication apparatus 136 and used to track the ground communication apparatus 100, as described further herein.

Figure 2:
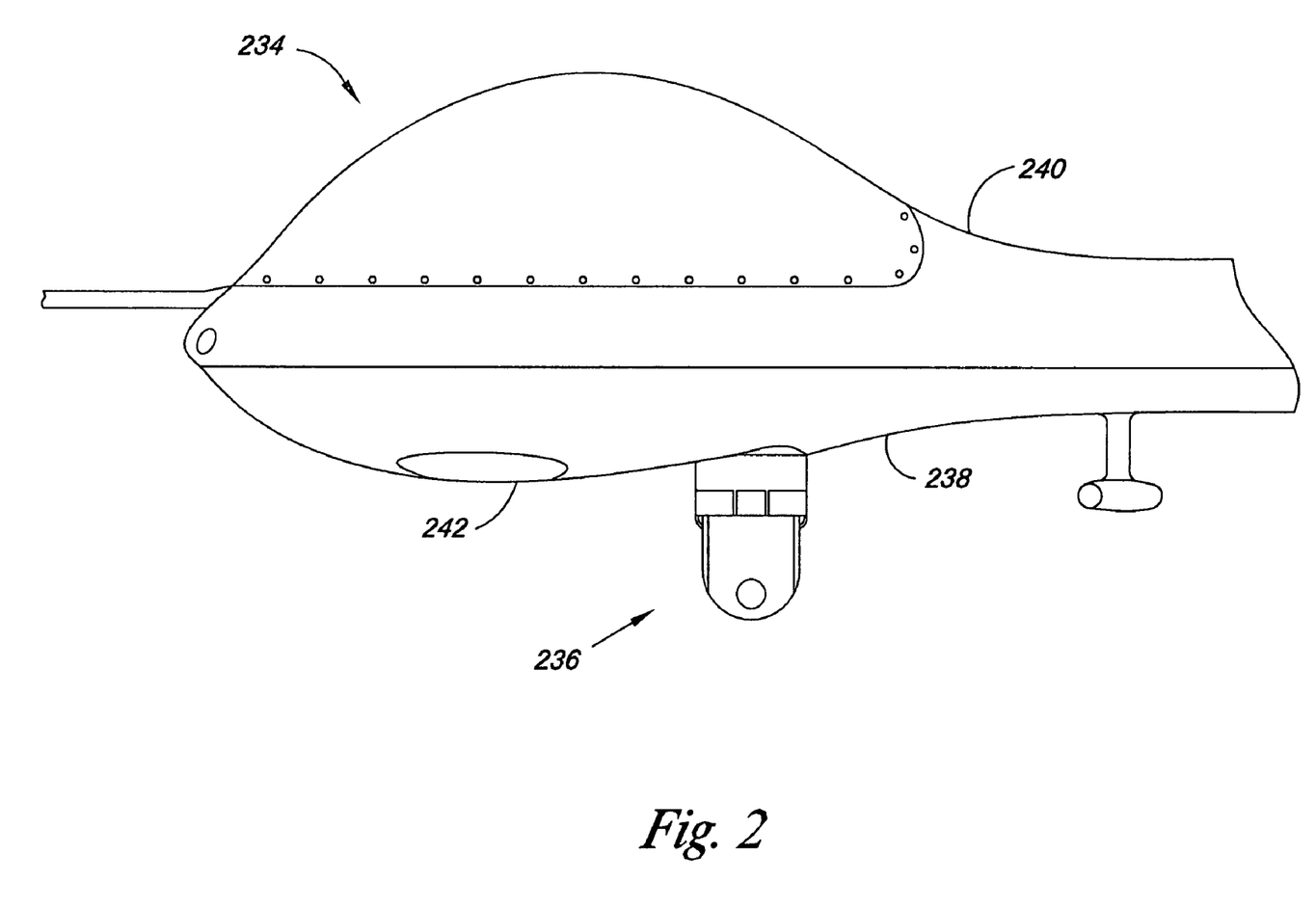
FIG. 2 is an illustration of an unmanned aerial vehicle (UAV) having a free space optical communication apparatus in accordance with an embodiment of the present disclosure.

FIG. 2 is an illustration of an unmanned aerial vehicle (UAV) having a free space optical communication apparatus in accordance with an embodiment of the present disclosure. As illustrated, the UAV 234 is relatively small as compared to a spacecraft or other similar sized aircraft.

Examples of UAVs include a Predator drone, a Global Hawk, or various other UAVs. In addition, embodiments of the present disclosure can be implemented on other types of manned and unmanned vehicles including ground vehicles (e.g., military vehicles or automobiles), marine vehicles, and various manned aerial vehicles such as manned planes, space shuttles, air balloons, etc.

In some embodiments, the UAV 234 can have a wing span of, for example, three (3) meters (m). The size of the UAV 234 can make the use of compact and/or light weight terminal hardware beneficial.

In some embodiments, the free space optical communication apparatus 236 according to the present disclosure can provide for high speed transmission of data from, for example, the UAV 234 to a ground communication apparatus. In some instances, the high speed transmission of data can include high definition video image streaming.

In some embodiments, the UAV 234 can include a number of cameras. The cameras can be any suitable type of camera. Suitable cameras include one or more mega-pixel digital imagers or other cameras capable of providing digital image data or video image data.

In FIG. 2, the element 242 identifies the general location of the number of cameras in the embodiment illustrated. In some embodiments, the cameras can communicate with a free space optical communication apparatus 236 for transmitting the digital image data or video image data captured by the cameras. In various embodiments, other types of information that are to be transmitted from UAV 234 to a ground location can be sent via the free space optical communication apparatus 236.

In some embodiments, the free space optical communication apparatus 236 can be mounted to the UAV 234 on a lower surface 238 of the UAV 234. The free space optical communication apparatus 236 can also be mounted to the UAV in other locations including the top surface 240 of the UAV 234, or inside the UAV 234.

In the embodiment of FIG. 2, the free space optical communication apparatus 236 can be a gimbaled apparatus. Movable apparatuses can be of various types and can have many functions where beam pointing stabilization would be helpful.

As used herein, a gimbaled apparatus refers to an apparatus that is capable of rotating in more than one dimension. In some embodiments, for example, the free space optical communication apparatus 236 can rotate in two dimensions. The free space optical communication apparatus 236 illustrated in FIG. 2 includes a number of components described in more detail herein.

Figure 3:
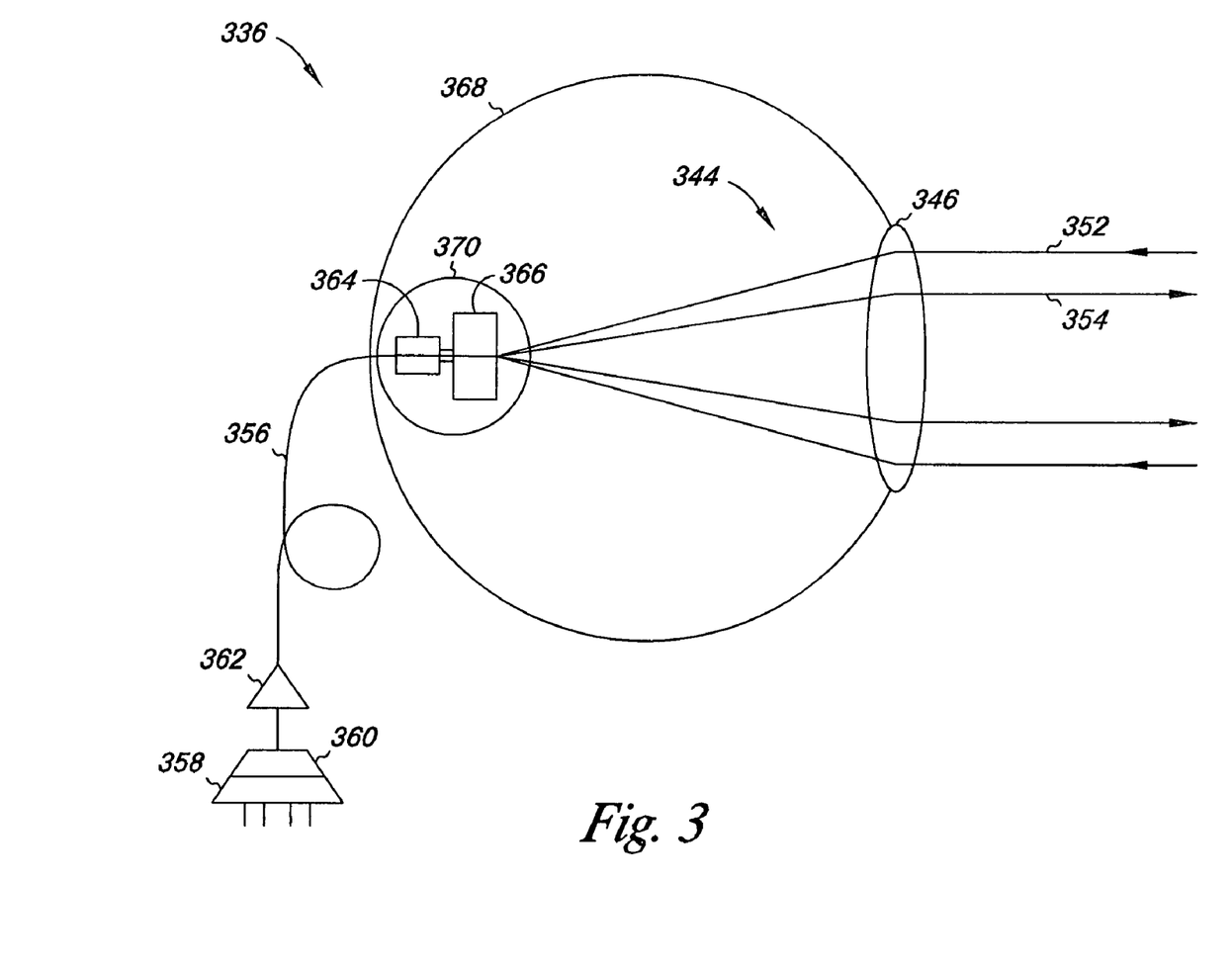
FIG. 3 is an illustration of an embodiment of a free space optical communication apparatus according to the present disclosure.

FIG. 3 is an illustration of an embodiment of a free space optical communication apparatus according to the present disclosure. In some embodiments, the free space optical communication apparatus 336 can be symmetric (i.e., provides symmetrical two way communication) or asymmetric (i.e., but does not send and receive data at equal data rates).

As illustrated in the embodiment of FIG. 3, a free space optical communication apparatus 336 can include an optical telescope 344 for concentrating the beacon signal received from a ground communication apparatus. The optical telescope 344 can include a lens 346 and a photodetector (provided in the light source mount 366 in the embodiment of FIG. 3), among other components. This structure is also used to send information from the light source, through the lens 346 and to a receiver (e.g., one or more ground, air, and/or marine based stations).

In some embodiments, the incoming beacon signal can contain data transmitted from, for example, the ground communication apparatus to the apparatus 336. In some embodiments, the free space optical communication apparatus 336 includes a light source 356 for emitting a light beam 354, where the light beam 354 includes a signal to be transmitted (e.g., an outgoing transmission signal). As used herein, the "focal plane" of an optical telescope refers to a location where the outgoing light beam originates from and/or where incoming signal beams converge to a signal point.

In some embodiments, the light source 356 can be one or more optical fibers, for example, one or more single mode and/or multimode optical fibers. In addition, in some embodiments, the optical fibers can be terminated at a light source mount 366 and positioned adjacent the focal plane of the optical telescope 344.

As stated above, in such embodiments, the optical fibers can have the same or different optical properties. For example, the optical fiber can produce different intensity light beams.

In some embodiments, the optical fibers can be connected to different light sources, for example, having different intensities and/or different wavelengths. In such embodiments, the combination or use of different light sources and/or optical fibers can be used to broaden or narrow the light beam and/or improve the ability of a light beam to communicate having a larger diameter.

As discussed herein, the free space optical communication apparatus 336 can be mounted to a UAV where the use of compact and/or light weight hardware can be beneficial. In such embodiments, the free space optical communication apparatus 336 can include the ability to change the diameter of the beam the light beam 354 toward a ground communication apparatus and the ability to track the ground communication apparatus with sufficient performance to provide an optical link while the UAV is in motion.

In the embodiment of FIG. 3, a light source actuator 364 can be used to move the light source mount to change the distance of the light source 366 to the lens 346. In this manner, the diameter of the light beam can be widened or narrowed.

Actuators that are used to move the light source mount and/or the lens (in the embodiment of FIG. 4) can be any suitable type of actuator. For example, in some embodiments electrical actuators (e.g., piezo-electric) or various mechanical actuators (e.g., worm drive) can be utilized.

In such embodiments, by using the actuator 364 to move the light source forward, the diameter of the beam will be made smaller and therefore, the beam will be more focused when it is received. By using the actuator 364 to move the light source backward, the diameter of the beam will be made larger and therefore, the beam will be broader when it is received. Through such adjustments, the beam can be changed based upon environmental changes, power consumption changes, changes in desired data rate, for aid in the location of a receiver, and other situations in which adjusting the beam diameter may be beneficial.

In some embodiments, the light source 356 can be coupled to one or more tracking actuators 370 (e.g., a high speed and/or low speed tracking actuator) that can move the light source 356 adjacent to the optical telescope 344 in the focal plane in, for example, two-dimensions. In some embodiments, the tracking actuator 370 can be a gimbal actuator or a servo actuator, for example. By moving the light source mount 366, the outgoing light beam 354 can point in varying directions.

As stated above, in some embodiments, the optical properties of the lens material of one or more lenses can be used instead of, or in addition to, the movement of the light source and/or the one or more lenses. For example, in various embodiments, the lens material can be modified to change one or more of a number of optical characteristics of the lens material. The modifiable lens can be made from any suitable material.

For example, if it is desirable to change the focal length of the modifiable lens, materials such as water, liquid crystal, or suitable polymers may be utilized. Such materials may be used in combination with other non-modifiable lens materials in some embodiments. These materials can be modified, for example, utilizing changes in pressure, temperature, stress, shape change, and/or chemical change, among other mechanisms for modification.

Embodiments of the free space optical communication apparatus 336 can include an electrical multiplexer 358 to drive a laser transmitter 360 as input to an optical amplifier 362 to connect an optical signal through the light source 356 to the optical telescope 344. For example, an electrical multiplexer 358 can accept multiple independent data signals and combine them into a single signal to modulate the laser transmitter 360.

In some embodiments, the laser transmitter 360 can be a laser diode. In various embodiments, the optical amplifier 362 can be an erbium doped fiber amplifier (EDFA).

In various embodiments, the optical amplifier 362 can receive the optical signal from the laser transmitter 360 and can provide an amplified optical signal at a desired power level to the light source 356 (e.g., optical fiber). As discussed herein, the light source 356 can be an optical fiber, for example, a single mode optical fiber that can deliver the amplified optical signal from the optical amplifier 362 to the optical telescope 344. The optical telescope 344 can propagate the optical signal through free space to a ground communication apparatus.

In some embodiments, optical telescope 344 can include one or more lenses 346, for example, a glass lens, which can be used to bend or refract light. For example, the lens 346 can refract an incoming beacon signal 352 and an outgoing transmit signal 354.

In some embodiments, the lens 346 can be convex (i.e., becoming thinner toward its edges), so that the lens 346 can bend light at the edge of the lens 346 to a greater angle than light coming through the center. Convex lenses can be utilized in some embodiments, for example, to converge all of the incoming signals to a focal point.

In addition, the output light beam has a tendency to diverge the further away from the source it progresses. Accordingly, one or more lenses can be used to reduce or minimize this diversion based upon a particular position of the focal plane.

In addition, in some embodiments, a sensor (not shown) can be used to track the position of the light source. In some embodiments, the photodetector and the sensor can be in communication with a control component. In various embodiments, the control component can be used to calculate the position of the incoming beacon signal 352 with respect to the position of the light source 356, from the photodetector and/or sensor information.

In some embodiments, the free space optical communication apparatus 336 can include a dedicated two-way radio frequency (RF) link from the ground communication apparatus to the apparatus 336. A RF link can, for example, maintain a functional communication link between the apparatus 336 and the ground communication apparatus by providing for uplink data transfer from the ground communication apparatus to the apparatus 336.

In some embodiments, the RF link can be used as a redundant communication link if the free space optical link is interrupted. In addition, in some embodiments, the RF link can be used to direct a UAV, for example, back to a position where a last free space optical communication was transmitted. Such embodiments can provide such functionality, for example, through executable instructions and/or logic circuitry and information regarding the last known signal position.

Figure 4:
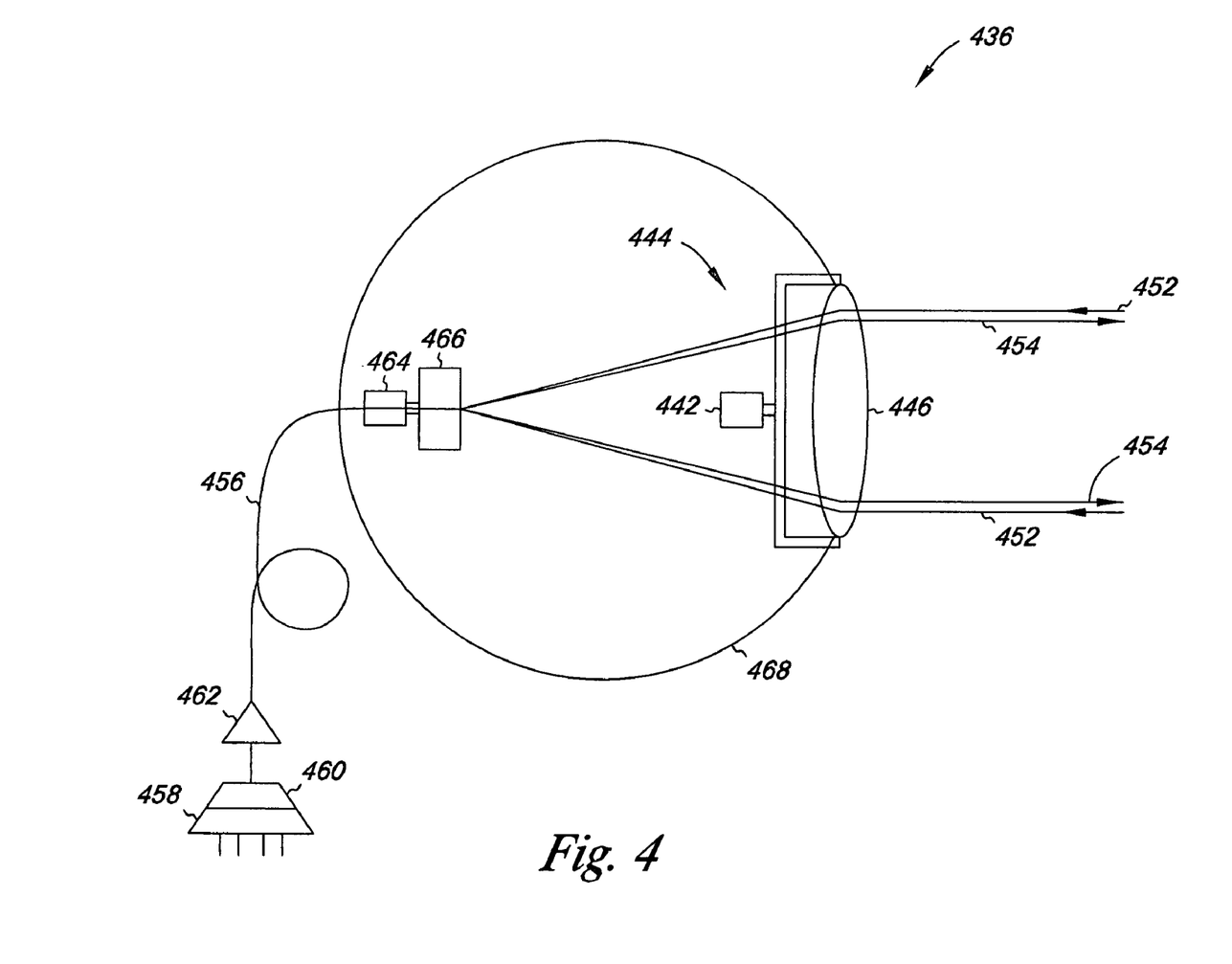
FIG. 4 is an illustration of another embodiment of a free space optical communication apparatus according to the present disclosure.

FIG. 4 is an illustration of an embodiment of a free space optical communication apparatus according to the present disclosure. As shown in the embodiment of FIG. 4, the free space optical communication apparatus 436 can be designed to transmit optical data and receiving an incoming signal 452 (e.g., a beacon signal or other signal type).

In some embodiments, the free space optical communication apparatus 436 can include an optical telescope 444, where the optical telescope 444 can include a number of lenses 446 and light source mount 466 having a photodetector therein. In addition, the free space optical communication apparatus 436 can include a light source 456 for emitting a light beam 454, where the light beam 454, for example, includes a signal to be transmitted (e.g., an outgoing transmission signal).

In the embodiment illustrated in FIG. 4, the light source 456 can be positioned adjacent the focal plane (e.g., at the front surface of the light source mount) of the optical telescope 444. In some embodiments, the light source 456 can be an optical fiber, for example, a single mode optical fiber.

Similar to the embodiment in FIG. 3, in the embodiment of FIG. 4, a light source actuator 464 can be used to move the light source mount to change the distance of the light source 466 to the lens 446. In this manner, the diameter of the light beam can be widened or narrowed.

However, in the embodiment of FIG. 4, a lens actuator 442 is also provided to make adjustments to the distance between the light source and the lens. In some embodiments, the apparatus can just utilize a lens actuator to provide the adjustment.

In such embodiments, by using the light source actuator 464 to move the light source forward, the diameter of the beam will be made smaller and therefore, the beam will be more focused when it is received. This can also be accomplished by moving the lens actuator backward, in addition to, or instead of the light source actuator's movement.

Further, by using the light source actuator 464 to move the light source backward, the diameter of the beam will be made larger and therefore, the beam will be broader when it is received. This can also be accomplished by moving the lens actuator forward, in addition to, or instead of the light source actuator's backward movement. As with the embodiment of FIG. 3, through such adjustments, the beam can be changed based upon environmental changes, power consumption changes, changes in desired data rate, for aid in the location of a receiver, and other situations in which adjusting the beam diameter may be beneficial.

In some embodiments, the apparatus 436 can use a control component to calculate the movement of either one or both of the light source actuator 464 or the lens actuator 442. Such movement calculations can be based on a number of factors as discussed above. For example, the position of apparatus 436 with respect to one or more other apparatuses (e.g., ground, air, or marine based stations), based on the positions of the one or more lenses and/or the light sources, based on the position of the beacon signal 452, based on an environmental condition, and/or based on a power consumption condition.

Such movement can be accomplished, for example, by calculating an amount and a direction of movement with a processor and/or logic circuitry based upon the one or more factors and communicating the movement to the one or more actuators. Such movement can, for instance, be provided as instructions that are executed by the processor and/or logic circuitry to actuate the one or more actuators, in some embodiments.

Although specific embodiments have been illustrated and described herein, those of ordinary skill in the art will appreciate that any arrangement calculated to achieve the same techniques can be substituted for the specific embodiments shown. This disclosure is intended to cover adaptations or variations of various embodiments of the present disclosure.

It is to be understood that the above description has been made in an illustrative fashion, and not a restrictive one. Combination of the above embodiments, and other embodiments not specifically described herein will be apparent to those of ordinary skill in the art upon reviewing the above description.

The scope of the various embodiments of the present disclosure includes various other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the present disclosure require more features than are expressly recited in each claim.

Rather, as the following claims reflect, inventive subject matter may lie in less than all features of a single disclosed embodiment. Thus, the following claims are hereby incorporated into the Detailed Description, with each claim standing on its own as a separate embodiment.

What is claimed is:

1. A free space optical communication system, comprising:
    a light source for emitting a light beam toward a receiver, where the light beam includes a signal to be transmitted;
    an output lens through which the light beam is directed toward the receiver; and
    an actuator coupled to the light source and configured to adjust a distance between the light source and the output lens in order to adjust the diameter of the light beam in response to relative position changes between the receiver and the light source while the light source and receiver are moving relative to each other.

2. The system of claim 1, where the actuator is a worm gear.

3. The system of claim 1, where the light source is an optical fiber.

4. The system of claim 1, where the actuator is a piezoelectric actuator.

5. The system of claim 1, where the system includes a data rate adjustor for adjusting the data rate based upon the position of the light source.

6. The system of claim 5, where the data rate adjustor is an application specific integrated circuit.

7. The system of claim 1, where the system includes an actuator coupled to the output lens for moving the lens to adjust the diameter of the light beam.

8. The system of claim 1, where the system includes a radio frequency communication link as a redundant communication link.

9. A free space optical communication apparatus, comprising:
    a light source for emitting a light beam toward a receiver, where the light beam includes a signal to be transmitted;
    an output lens through which the light beam is directed toward the receiver; and
    an actuator coupled to the output lens and configured to adjust a distance between the lens and the light source in order to adjust the diameter of the light beam in response to relative position changes between the receiver and the light source while the light source and receiver are moving relative to each other.

10. The apparatus of claim 9, where the apparatus includes a control apparatus for driving the actuator based on information about a position of the receiver to adjust the diameter of the light beam.

11. The apparatus of claim 9, where the free space optical communication apparatus is mounted to an unmanned aerial vehicle (UAV).

12. The apparatus of claim 9, where the free space optical communication apparatus is included with a gimbal tracking actuator for movement of the apparatus based upon information about a position of the receiver.

13. The apparatus of claim 12, where the apparatus includes instructions executable on a processor and stored in memory to track the position of multiple receivers and calculate the adjustment of the output lens and the gimbal tracking actuator to direct the light beam from a first receiver to a second receiver of the multiple receivers.

14. A free space optical communication apparatus, comprising:
- a light source for emitting a light beam toward a receiver, where the light beam includes a signal to be transmitted;
- an output lens through which the light beam is directed toward the receiver;
- an actuator coupled to the output lens and configured to adjust a distance between the lens and the light source in order to adjust the diameter of the light beam in response to relative position changes between the receiver and the light source while the light source and receiver are moving relative to each other; and
- where the lens is formed from a material having lens focal modifying characteristics.

15. The apparatus of claim 14, where the lens is formed from a material selected from a group of materials, including:
- liquid crystal;
- polymer; and
- water.

16. A method of providing free space optical communication, comprising:
- receiving an incoming beacon signal from a communication apparatus;
- adjusting a distance between a lens and a light source in an unmanned aerial vehicle based on a position of the incoming beacon signal received in order to alter a light beam diameter in response to relative position changes between a source of the incoming beacon signal and the light source while the light source and the source of the incoming beacon signal are moving relative to each other; and
- transmitting the light beam through the lens to direct the beam toward the source of the incoming beacon signal, where the light beam includes a signal to be transmitted.

17. The method of claim 16, where the method includes adjusting the intensity of the light beam based upon the position of the light source.

18. The method of claim 17, where the method includes adjusting the intensity of the light beam based upon position information provided by the beacon signal.

19. The method of claim 18, where the method includes moving the beam in six degrees of freedom to adjust the diameter of the beam and the direction of the beam.

20. The method of claim 19, where the first diameter is larger than the second diameter.

21. The method of claim 20, where the first diameter is sized to provide a broad diameter, low rate signal transmission beam for aiding in locating the unmanned aerial vehicle with the communication apparatus.

22. The method of claim 18, where adjusting the distance between a lens and the light source includes moving the light source to a first position that provides a first beam diameter and moving the light source to a second position that provides a second beam diameter.

23. The method of claim 18, where the method includes evaluating a number of environmental conditions and positioning the light source based upon at least one of the number of environmental conditions.

24. The method of claim 18, where the method includes receiving a beacon signal from a beacon source proximate to the light beam receiver.

25. The method of claim 24, where adjusting the distance between a lens and the light source includes moving the light source based upon positioning information received in the beacon signal.

* * * * *